(12) United States Patent
Melikian (10) Patent No.: US 9,019,488 B2
(45) Date of Patent: Apr. 28, 2015

(54) WHEEL TOE AND CAMBER MEASUREMENT SYSTEM

(71) Applicant: Recognition Robotics, Inc., Elyria, OH (US)

(72) Inventor: Simon Melikian, Westlake, OH (US)

(73) Assignee: Recognition Robotics, Inc., Elyria, OH (US)

( * ) Notice: Subject to any disclaimer, the term of this patent is extended or adjusted under 35 U.S.C. 154(b) by 38 days.

(21) Appl. No.: 13/925,022

(22) Filed: Jun. 24, 2013

(65) Prior Publication Data

US 2013/0342830 A1 Dec. 26, 2013

Related U.S. Application Data (60) Provisional application No. 61/663,709, filed on Jun. 25, 2012.

(51) Int. Cl.
*G01B 11/275* (2006.01)

(52) U.S. Cl.
CPC ........ *G01B 11/2755* (2013.01); *G01B 2210/14* (2013.01)

(58) Field of Classification Search
CPC ..................... G01B 11/2755; G01B 2210/143; G01B 2210/286; G01B 11/275

USPC .............................................. 356/3.01–139.1
See application file for complete search history.

(56) References Cited

U.S. PATENT DOCUMENTS

| | | | |
|---|---|---|---|
| 6,894,771 B1 | 5/2005 | Dorrance et al. | |
| 2005/0068522 A1* | 3/2005 | Dorrance et al. | ........ 356/139.09 |
| 2007/0081147 A1 | 4/2007 | Van Den Bossch | |
| 2011/0102779 A1* | 5/2011 | De Sloovere et al. | ... 356/139.09 |

FOREIGN PATENT DOCUMENTS

DE 2948573 6/1981

* cited by examiner

*Primary Examiner* — Luke Ratcliffe
(74) *Attorney, Agent, or Firm* — Rankin, Hill & Clark LLP (57) ABSTRACT

A method for measuring wheel alignment of a test wheel rotating about a z-axis using at least one camera and a processor includes obtaining a calibration point from a calibration image of a zero-offset wheel that is the same size as the test wheel and that rotates about the z-axis, obtaining at least one test image of the test wheel with the camera and a non-structured light source, and locating a measurement point in the test image. The measurement point coincides with a radius that the calibration point is offset from the z-axis and the angular displacement of the calibration point from the vertical diameter of the zero-offset wheel. The measurement point is further located based on a change of reflectivity between other points in the test image adjacent the measurement point.

15 Claims, 7 Drawing Sheets

WHEEL TOE AND CAMBER MEASUREMENT SYSTEM

BACKGROUND

Non-contact vehicle wheel alignment measuring systems either use (1) structured light (i.e., light sources able to project a line of light onto the wheel) or (2) non-structured light. Non-contact wheel alignment measuring systems that use non-structured light typically require "optical targets," which are separate from the wheel and are mounted to the wheel. The use of optical targets requires an operator to line up the targets to the wheel prior to measuring the wheel aligned, which increases the time required to test the wheel alignment and increases the complexity of the test for the operator of wheel alignment measuring system. While structured light typically does not require the use of optical targets, the linear light projected onto the wheel can be a concern to operators of the vehicle alignment measuring system and their employers.

SUMMARY

An example of a method for measuring wheel alignment will be described that can overcome at least one of the aforementioned shortcomings. The method is for measuring wheel alignment of a test wheel that is rotating about a z-axis using at least one camera in communication with a processor. The method includes obtaining a calibration point from a calibration image of a zero-offset wheel that is the same size as the test wheel and that rotates about the z-axis, obtaining at least one test image of the test wheel with the at least one camera and a non-structured light source, and locating a measurement point in the at least one test image. The measurement point coincides with a radius that the calibration point is offset from the z-axis and the angular displacement of the calibration point from the vertical diameter of the zero-offset wheel. The measurement point is further located using the processor based on a change of reflectivity between other points in the at least one test image adjacent the measurement point, and the change in reflectivity is based on a dissimilarity of reflectivity between components that make up the test wheel. Obtaining a calibration point from a calibration image of a zero-offset wheel and locating a measurement point in the at least one test image are repeated to provide a plurality of calibration points and a plurality of measurement points. The method further includes comparing each calibration point to a respective measurement point to measure the wheel alignment.

A system for measuring wheel alignment includes at least one camera and a processor in communication with the at least camera. The at least one camera is offset from a wheel that rotates about a z-axis. The at least one camera is configured to obtain a calibration image of a zero-offset wheel that is the same size as the test wheel and that rotates about the z-axis. The at least one camera is further configured to obtain at least one test image of a test wheel using a non-structured light source. The processor is configured to locate a calibration point from the calibration image based on a change in reflectivity between other points in the calibration image adjacent the calibration point. The processor is further configured to locate a measurement point in the at least one test image. The measurement point coincides with a radius that the calibration point is offset from the z-axis and the angular displacement of the calibration point from the vertical diameter of the zero-offset wheel. The processor is further configured to locate the measurement point based on a change of reflectivity between other points in the at least one test image adjacent the measurement point. The processor is further configured to measure a second displacement in the axis transverse to the z-axis of the second measurement point from a second calibration point in the matching second image.

DETAILED DESCRIPTION

Figure 1:
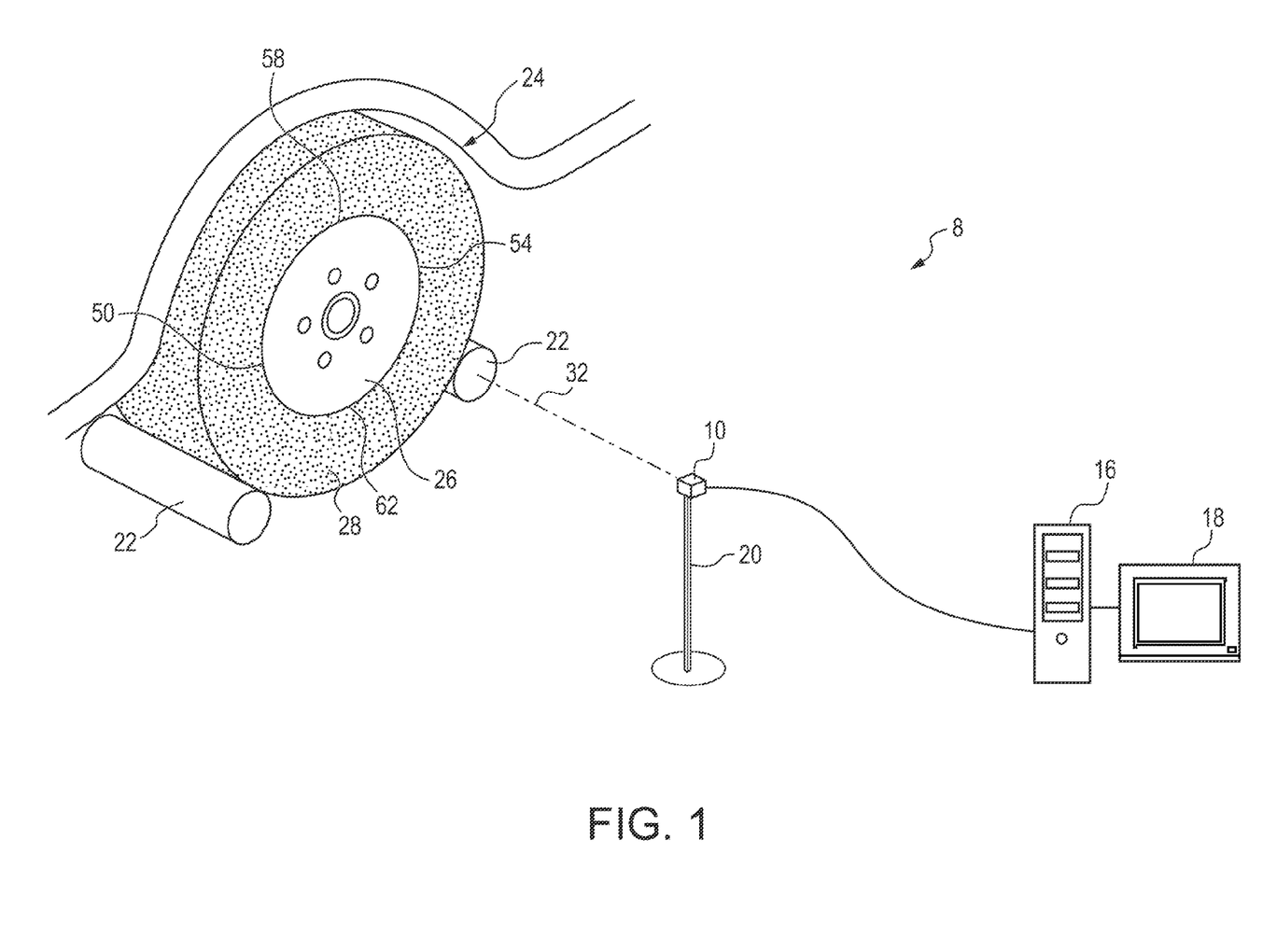
FIG. 1 is a schematic depiction of a wheel alignment measuring system and a vehicle wheel.

With reference to FIG. 1, a non-contact wheel alignment system 8 includes a camera 10 in communication with a processor 16, which is connected with a display 18. The camera 10 mounts to a frame 20. The frame 20 fixes the location of the camera 10 with respect to rollers 22. The system 8 measures the wheel alignment, e.g., toe and camber, of a wheel of a vehicle.

To calibrate the system 8, a wheel 24 having perfect alignment (hereinafter "zero-offset wheel") is positioned on the rollers 22. The zero-offset wheel 24 includes a rim 26 and a tire 28. The size of the zero-offset wheel 24, e.g. the diameter of the rim 26, is known. The zero-offset wheel 24 is rotated about a z-axis 32.

Figure 2:
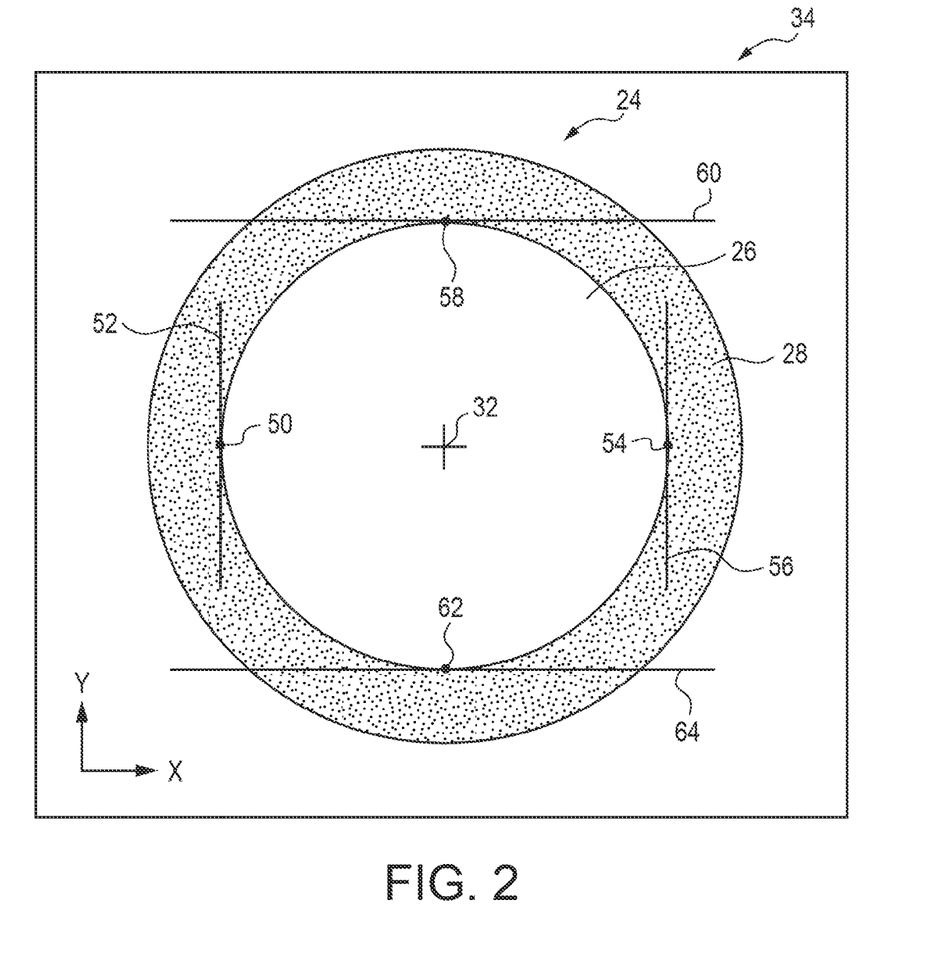
FIG. 2 is a schematic depiction of a calibration image obtained by the wheel alignment system depicted in FIG. 1.

With reference to FIGS. 1 and 2, as the wheel 24 is rotating, the camera 10 obtains a first calibration image 34, which can be displayed on the display 18 and is schematically depicted in FIG. 2. The first calibration image 34 depicts a surface of the zero-offset wheel 24 that is fixed in a plane, hereinafter the x-y plane, which is normal to the z-axis 32. Where the size of the zero-offset wheel 24 is known, datums can be established for reference when taking later measurements with the system 8.

After the first calibration image 34 has been obtained, the program running on the processor 16 locates calibration points on the first calibration image. The program running on the processor locates a first calibration point 50 on the first calibration image 34. For simplicity, the first calibration point 50 can be a point of intersection for a vertical tangent 52 to a curve defined by the wheel rim 26. The vertical tangent 52 can be a line perpendicular to the z-axis, which will hereinafter be referred to as the y-axis. The calibration point 50 can be located using a program running on the processor 16 due to the difference in reflection of the tire 28 as compared to the wheel rim 26. The program running on the processor 16 can assign gray-scale values to each pixel in the first calibration image 34. Since the reflectivity between the tire 28, which is made of rubber, and the rim 26, which is made of metal, greatly differ, the intersection of these two components can be easily located within the first calibration image 38.

U.S. Pat. No. 8,159,165 B2, which is incorporated by reference herein, discloses a computer program capable of detecting objects within an image. Such a program can run on the processor 16 to detect the curve defined by the wheel rim 26 and to locate a specific point on the wheel rim, which can act as the first calibration point 50.

A similar calibration point 54, hereinafter "second calibration point," can be located on the first calibration image 34 using the program running on the processor 16. The second calibration point 54 can be a point of intersection for another vertical tangent 56 to the curve defined by the wheel rim 26. Another calibration point 58, hereinafter "third calibration point," can be located on the first calibration image 34 using the program running on the processor 16. The third calibration point 58 can be a point of intersection for a horizontal tangent 60 to the curve defined by the wheel rim 26. The horizontal tangent 60 can be a line perpendicular to the y-axis and the z-axis, which will hereinafter be referred to as the x-axis. Another calibration point 62, hereinafter "fourth calibration point," can be located on the first calibration image 34 using the program running on the processor 16. The fourth calibration point 62 can be a point of intersection for another horizontal tangent 64 to the curve defined by the wheel rim 26.

The tangent lines 52, 56, 60 and 64 depicted in FIG. 2 are shown for points 50, 54, 58, and 62 located at the 9 o'clock, 3 o'clock, 12 o'clock, and 6 o'clock positions, respectively. Other tangent lines can be used where these points are located elsewhere on the zero-offset wheel 24. Also, each calibration point 50, 54, 58, and 62 can be a point within a pattern, or a point along a line or a curve in the first calibration image 34.

The system 8 can be calibrated for other zero-offset wheels having different sizes, e.g. different rim diameters, in a manner similar to the process described above. The distance between the frame 20, which holds the camera 10, and the zero-offset wheel 24 in the z-direction need not be known. Also, structured light and other "targets," which are mounted to the wheel in known systems, are unnecessary.

Figure 3:
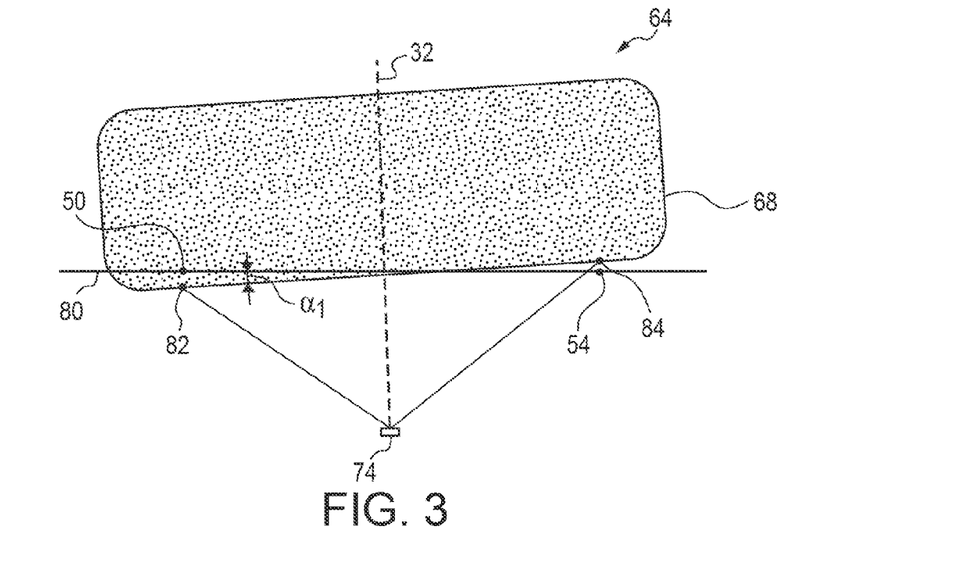
FIG. 3 is a top view of a test wheel, which is out of alignment, and an optical sensor of the wheel alignment system depicted in FIG. 1.
Figure 4:
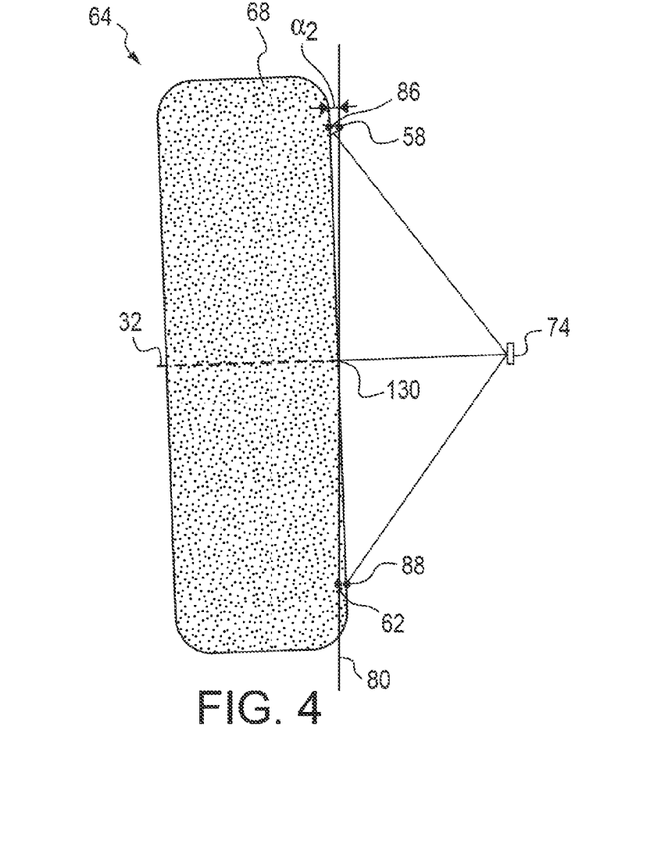
FIG. 4 is a front or rear view of the test wheel, which is out of alignment, and the optical sensor of the wheel alignment system depicted in FIG. 1.

With the system 8 now calibrated, the wheel alignment of other wheels (hereinafter "test wheels") can now be determined. FIGS. 3 and 4 depict a test wheel 64 having a wheel rim (not visible in FIGS. 3 and 4) and a tire 68. The test wheel 64 is out of alignment. The magnitude of the misalignment can be detected and measured using the system 8.

An optical sensor 74 of the camera 10 (not shown in FIGS. 3 and 4) obtains images of the test wheel 64 to measure and detect wheel alignment. The optical sensor 74 can be a conventional CCD planar array. Similar to the zero-offset wheel 24 depicted in FIG. 1, the test wheel 64 rotates about the z-axis 32 on the rollers 22. The camera 10 mounts in a known location on the frame 20 with respect to the rollers 22. It is desirable that the camera 10 be located in the same position with respect to the test wheel 64 that it was with respect to the zero-offset wheel 24. The wheel alignment system 8 obviates the need for structured light, which is used in many wheel alignment systems, by the use of the program running on the processor 16, which can be used to detect certain locations, e.g., measurement points, on the test wheel 64.

With reference back to FIG. 3, the camera 10 includes the optical sensor 74 that obtains a first test image of the test wheel 64. FIG. 3 shows a top view of the test wheel 64. The test wheel 64 is offset from the x-y plane 80, which is normal to the z-axis 32. Were the test wheel 64 as depicted in FIG. 3 to be aligned with the x-y plane, the test wheel 64 would have perfect toe. The system 8, now that it is calibrated, can measure the offset of the test wheel 64 from perfect toe. Since the test wheel 64 is offset from the x-y plane 80 and oriented as shown in FIG. 3, a first measurement point 82 of the test wheel 64 is closer in the z-direction to the optical sensor 74 as compared to the first calibration point 50 of the zero-offset wheel 24 depicted in FIGS. 1 and 2. Also, a second measurement point 84 of the test wheel 64 is farther in the z-direction to the optical sensor 74 as compared to the second calibration point 54 of the zero-offset wheel 24 depicted in FIGS. 1 and 2.

FIG. 4 shows another view of the test wheel 64 as the test wheel 64 would be viewed from a front or a rear of the vehicle. The test wheel 64 is again offset from the x-y plane 80. The location of the x-y plane 80 can be in a different location along the z-axis 32 than the x-y plane 80 shown in FIG. 3. Were the test wheel 64 as depicted in FIG. 4 to be aligned with the x-y plane, the test wheel 64 would have perfect camber. The system 8, now that it is calibrated, can measure the offset of the test wheel 64 from perfect camber. As depicted in FIG. 4, a third measurement point 86 of the test wheel 64 is farther in the z-direction from the sensor 74 as compared to the third calibration point 58 of the zero-offset wheel 24. Also, a fourth measurement point 88 of the test wheel 64 is farther in the z-direction from the sensor 74 as compared to the fourth calibration point 62 of the zero-offset wheel 24.

The measurement points 82, 84, 86, and 88 are located in a manner such that each measurement point coincides with a radius that a respective calibration point is offset from the z-axis and the angular displacement of the respective calibration point from the vertical diameter of the zero-offset wheel. For example, the first measurement point 82 is located near the 9 o'clock position and at around the same radius from the z-axis 32 as the first calibration point 50. Each measurement point 82, 84, 86, and 88 is further located using the processor 16 based on a change of reflectivity between other points in the at least one test image adjacent the measurement point. The change in reflectivity is based on a dissimilarity of reflectivity between components that make up the test wheel. This is similar to how the calibration points 50, 54, 58, and 62 were located. For example, each measurement point 82, 84, 86, and 88 is located at an intersection of a horizontal or vertical tangent to the curve defined at the intersection of the rim and the tire 68.

The processor 16 then compares each calibration point 50, 54, 58, and 62 to a respective measurement point 82, 84, 86, and 88 to measure the wheel alignment. More specific examples of this will be described with reference to a system that employs multiple cameras. It should be noted that the description of the system that includes multiple cameras is applicable to the system 8 that has been described above.

Figure 5:
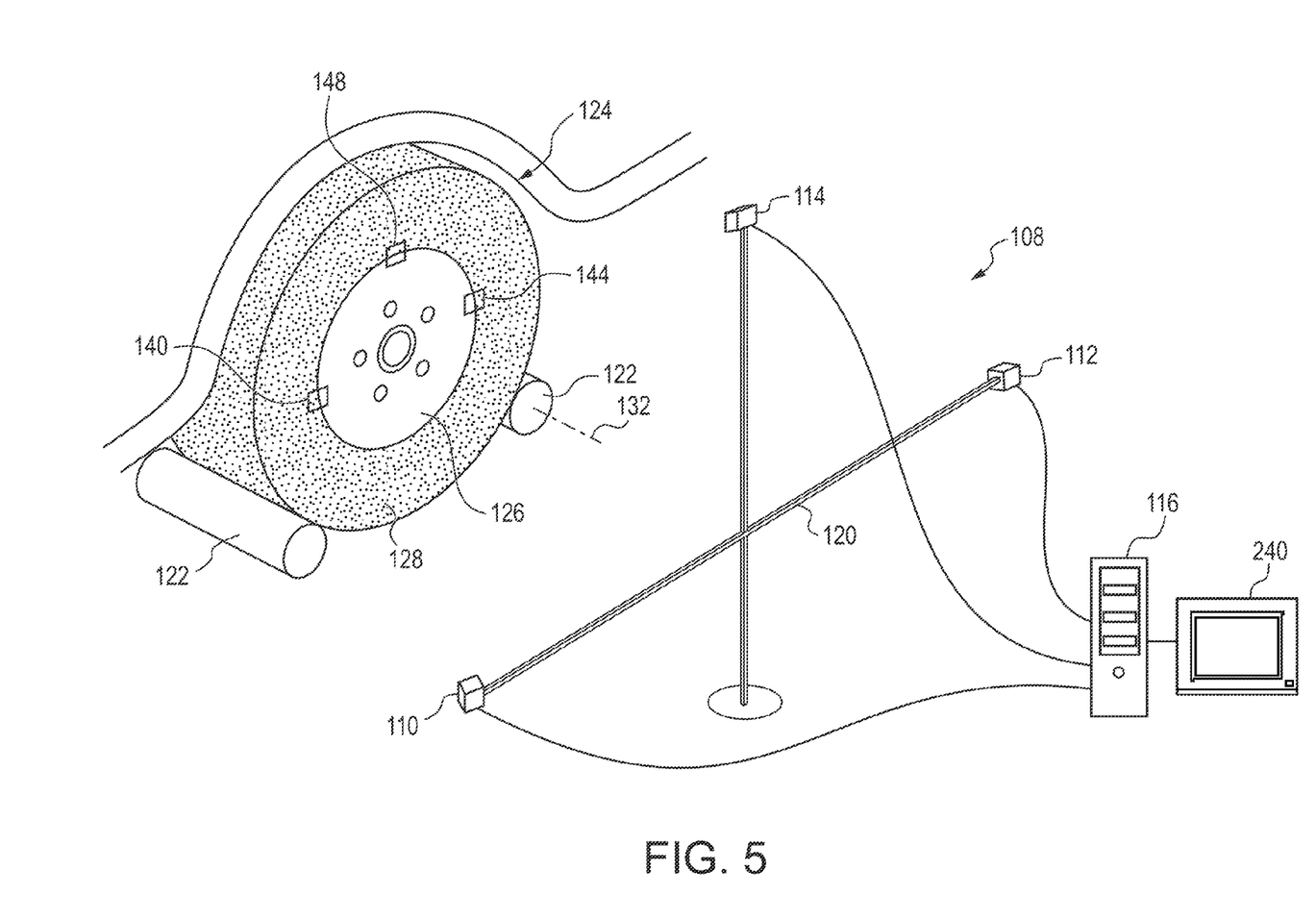
FIG. 5 is a schematic depiction of a wheel alignment measuring system and a vehicle wheel.

With reference to FIG. 5, a non-contact wheel alignment system 108 includes cameras 110, 112 and 114 (although only one camera may be employed) in communication with a processor 116. The cameras 110, 112, 114 each mount to a frame 120. The frame 120 fixes the location of the cameras 110, 112, 114 with respect to each other and with respect to rollers 122.

To calibrate the system 108, a wheel 124 having perfect alignment (hereinafter "zero-offset wheel") is positioned on the rollers 122. The zero-offset wheel 124 includes a rim 126 and a tire 128. The size of the zero-offset wheel 124, e.g. the diameter of the rim 126, is known. The zero-offset wheel 124 is rotated about a z-axis 132.

With reference to FIGS. 5 and 6(a)-6(c), as the wheel 124 is rotating, the first camera 110 obtains a first calibration image 138 of a first region 140 of the wheel 124, the second camera 112 obtains a second calibration image 142 of a second region 144 of the wheel 124, and the third camera 114 obtains a third calibration image 146 of a third region 148 of the wheel 124. The regions 140, 144 and 148 are fixed in a plane, hereinafter the x-y plane, which is normal to the z-axis. Accordingly, as the zero-offset wheel 124 is rotating, the zero-offset wheel 124 is moving with respect to the regions 140, 144 and 148. Since the size of the zero-offset wheel 124 is known, datums can be established for reference when taking later measurements with the system 108.

Figure 6A:
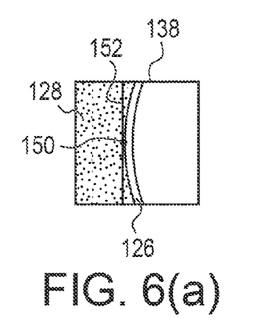
FIGS. 6(a)-6(c) are schematic depictions of calibration images obtained by the wheel alignment system depicted in FIG. 5.

After the calibration images 138, 142 and 144 have been obtained, the program running on the processor 116 locates a calibration point on each image. The program running on the processor locates a first calibration point 150 on the first calibration image 138. For simplicity, the first calibration point 150 can be a point of intersection for a vertical tangent 152 to a curve defined by the wheel rim 126. The vertical tangent 152 can be a line perpendicular to the z-axis, which will hereinafter be referred to as the y-axis. The calibration point 150 can be easy to locate due to the difference in reflection of the tire 128 as compared to the wheel rim 126. The program running on the processor 116 can assign grayscale values to each pixel in the calibration image. Since the reflectivity between the tire 128, which is made of rubber, and the rim 126, which is made of metal, greatly differ, the intersection of these two components can be easily located within the first calibration image 138.

U.S. Pat. No. 8,159,165 B2, which is incorporated by reference herein, discloses a computer program capable of detecting objects within an image. Such a program can run on the processor 116 to detect the curve defined by the wheel rim 126 and to locate a specific point on the wheel rim, which can act as the first calibration point 150.

Figure 6B:
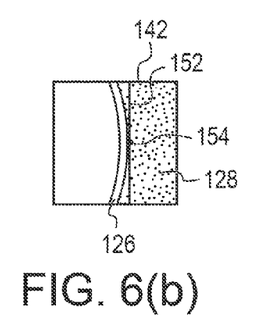
Figure 6C:
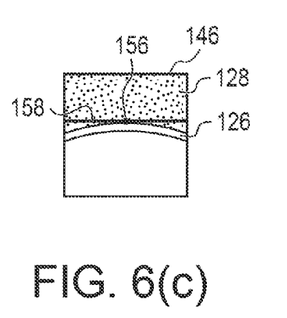

With reference to FIG. 6(b), a similar calibration point 154, hereinafter "second calibration point," can be located on the second image 142 using the program running on the processor 116. The second calibration point 154 can be a point of intersection for the vertical tangent 152 to the curve defined by the wheel rim 126. With reference to FIG. 6(c), a similar calibration point 156, hereinafter "third calibration point," can be located on the third image 146 using the program running on the processor 116. The third calibration point 156 can be a point of intersection for a horizontal tangent 158 to the curve defined by the wheel rim 126. The horizontal tangent 158 can be a line perpendicular to the y-axis and the z-axis, which will hereinafter be referred to as the x-axis.

The tangent lines 152 and 158 depicted in FIGS. 6(a)-6(c) are shown for regions 140, 144 and 148 being located at the 9 o'clock, 3 o'clock and 12 o'clock positions, respectively, in FIG. 5. Other tangent lines can be used where these regions are located elsewhere on the zero-offset wheel 124. Also, each calibration point 150, 154 and 156 can be a point within a pattern, or a point along a line or a curve in each respective image 138, 142 and 146. More than one calibration point can be located within each respective image 138, 142 and 146, such that a calibration pattern, or a calibration curve or line could also be employed.

The system 108 can be calibrated for other zero-offset wheels having different sizes, e.g. different rim diameters, in a manner similar to the process described above. The distance between the frame 120, which holds the cameras 110, 112 and 114, and the zero-offset wheel 124 in the z-direction need not be known. Also, structured light and other "targets," which are mounted to the wheel in known systems, are unnecessary.

Figure 7:
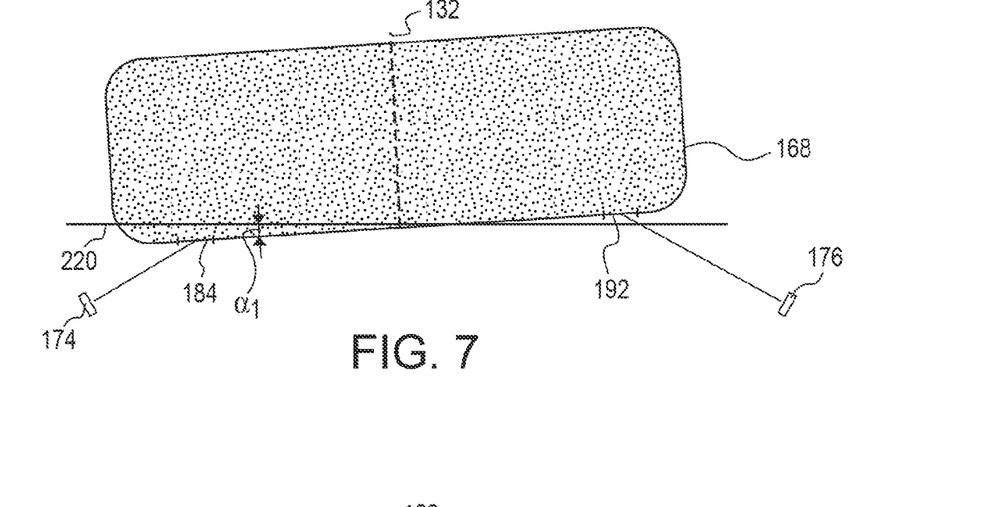
FIG. 7 is a top view of a test wheel, which is out of alignment, and first and second optical sensors of the wheel alignment system depicted in FIG. 5.
Figure 8:
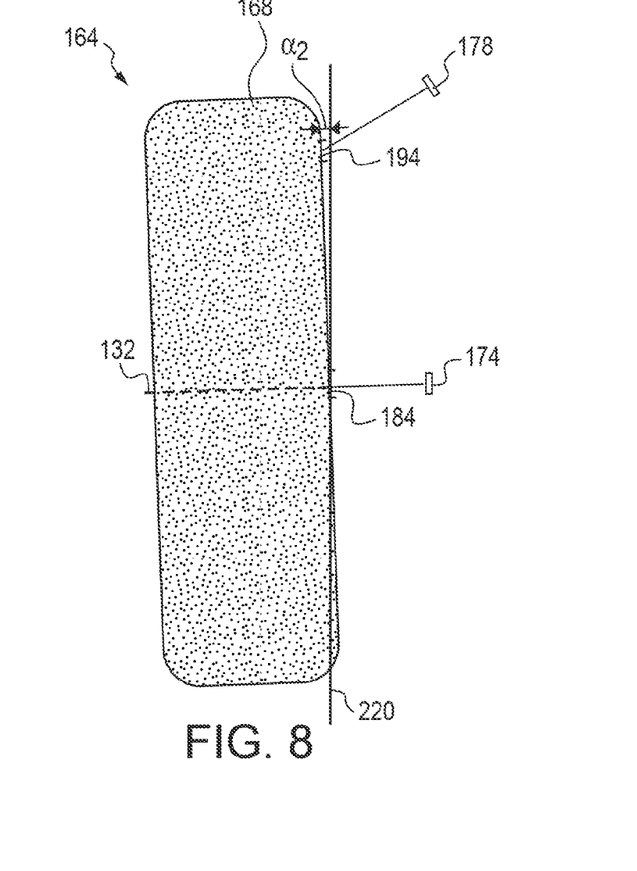
FIG. 8 is a front or rear view of the test wheel, which is out of alignment, and the first and third optical sensors of the wheel alignment system depicted in FIG. 5.

With the system 108 now calibrated, the wheel alignment of other wheels (hereinafter "test wheels") can now be determined. FIGS. 7 and 8 depict a test wheel 164 having a wheel rim 166 (see FIGS. 9(a)-9(c)) and a tire 168. The test wheel 164 is out of alignment. The magnitude of the misalignment can be detected and measured using the system 108.

At least one camera (in the illustrated embodiment the three cameras 110, 112 and 114 depicted in FIG. 5) obtain images of the test wheel 164 to measure and detect wheel alignment. Similar to the zero-offset wheel 124 depicted in FIG. 1, the test wheel 164 rotates about the z-axis 132 on the rollers 122. The cameras 110, 112 and 114 are mounted in a known location on the frame 120 with respect to the rollers 122. The wheel alignment system 108 obviates the need for structured light, which is used in many wheel alignment systems, by the use of the program running on the processor 116, which can be used to detect certain regions of the test wheel 164.

With reference to FIG. 7, the first camera 110 (shown only in FIG. 1) includes an optical sensor 174 and the second camera 112 (shown only in FIG. 1) includes an optical sensor 176. With reference to FIG. 8, the third camera 114 (shown only in FIG. 5) includes an optical sensor 178 (FIGS. 7 and 8). Each optical sensor 174, 176 and 178 can be a conventional CCD planar array.

Figure 9A:
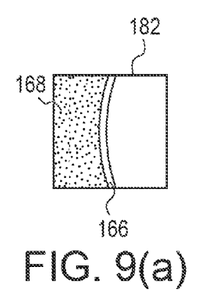
FIGS. 9(a)-9(c) are schematic depictions of a first test image, a first rotated image, and a second rotated image, for use with the wheel alignment system depicted in FIG. 5.

With reference back to FIG. 7, the first camera 110 includes the optical sensor 174 that obtains a first test image 182 (FIG. 9(a)) of a first region 184, which is in a similar location as the first region 140 in FIG. 5, of the test wheel 164. The first test image 182 is then learned by the program running on the processor 116. U.S. Pat. No. 8,159,165 B2, which was discussed before, discloses a method for teaching a software program to recognize an object. Such a software program, which can run on the processor 116, can be used to learn, or recognize, the pattern of the first test image 182.

Figure 9B:
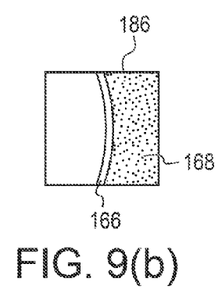
Figure 9C:
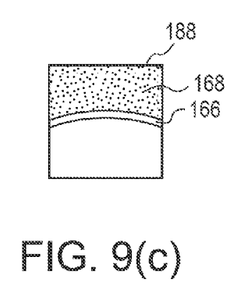

After the first test image 182 has been obtained, the processor 116 rotates the first test image 182 to generate, for example, a first rotated image 186 shown in FIG. 9(b) and a second rotated image 188 shown in FIG. 9(c). The rotated images 186 and 188 derive from the first test image 182 being rotated about an axis that is parallel to the z-axis 132. Multiple rotated images can be stored in the memory associate with the processor 116. By using the rotated images 186 and 188, other regions, e.g. a second region 192 (FIG. 7) and a third region 194 (FIG. 8), of the test wheel 164 can be located because of the symmetry of the test wheel 164.

Figure 10A:
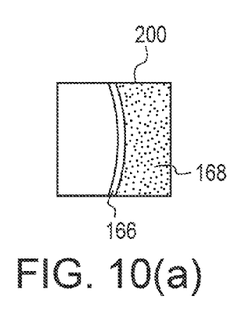
FIGS. 10(a) and 10(b) are schematic depictions of a first target image and a second target image obtained by the wheel alignment system depicted in FIG. 5.
Figure 10B:
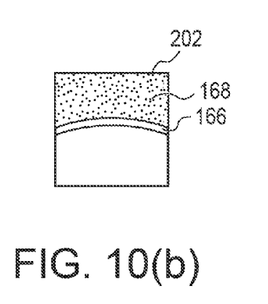

For example, the second camera 112 can be used to locate the second region 192 of the test wheel 164 and the third camera 114 can be used to locate the third region 194. The second region 192 of the test wheel 164 is in a similar location as the second region 144 shown in FIG. 5, and the third region 194 of the test wheel 164 is in a similar location as the third region 148 shown in FIG. 5. The second camera 112 obtains images 200 (only one of which is shown in FIG. 10(a), hereinafter "first target images") of the test wheel 164, and the third camera 114 obtains images 202 (only one of which is shown in FIG. 10(b), hereinafter "second target images"). These target images 200 and 202 are fed to the program running on the processor 116.

The program running on the processor 116 then recognizes the second region 192 (FIG. 7) of the test wheel 164 by matching a pattern found in the first target images 200 to a pattern found in one of the rotated images. In this instance, the first target image 200 would match, or correspond to, the first rotated image 186 in FIG. 9(b). With reference back to FIG. 9, the first rotated image 186 corresponds to the first test image 182 after the first test image 182 has been rotated an angle $\theta_1$ about an axis parallel to the z-axis 132. The angle $\theta_1$ is equal to the angular offset of the first region 184 of the test wheel 164 from the second region 192 of the test wheel 164 about the z-axis 132. After matching the first target image 200 to the first rotated image 184, the program assigns the matching image, which is depicted as the matching second image 210 in FIG. 11 (b). The matching second image 210 accurately corresponds to the second region 192 of the test wheel 164.

The program running on the processor 116 also recognizes the third region 194 (FIG. 8) of the test wheel 164 by matching a pattern found in the second target images 202 to a pattern found in one of the rotated images. In this instance, the second target image 202 would match, or correspond to, the second rotated image 188 in FIG. 9(c). The second rotated image 188 corresponds to the first test image 182 after the first test image 182 has been rotated an angle $\theta_2$. The angle $\theta_2$ is equal to the angular offset of the first region 184 of the test wheel 164 from the third region 194 of the test wheel 164 about the z-axis 126. After matching the second target image 202 to the second rotated image 188, the program assigns the matching image, which is depicted as the matching third image 212 in FIG. 11 (c). The matching third image 212 accurately corresponds to the third region 194 of the test wheel 164.

A program capable of recognizing images is also further described in U.S. Pat. No. 8,159,165 B2. Such a program can be used to locate the regions on the test wheel 164. Other image-matching algorithms known in the art, such as using binary images to represent gray scale images, normalized grayscale correlation, blob analysis, geometric based search and recognition, contour based search, affine invariant constellation based recognition, corner detection, salient icon detection, scale invariant feature transform, can be used to locate the second region 192 and the third region 194 of the test wheel 164.

Figure 11A:
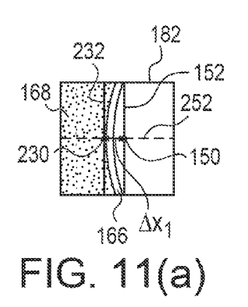
FIGS. 11(a)-11(c) are schematic depictions of the first test image, a matching second image, and a matching third image for use with the wheel alignment system depicted in FIG. 5.
Figure 11B:
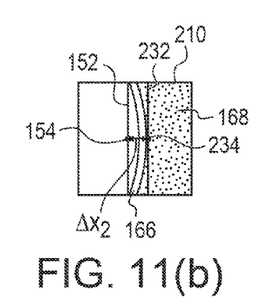
Figure 11C:
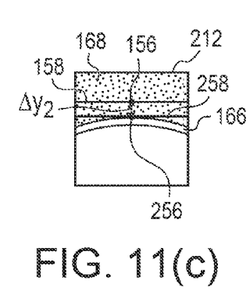

FIGS. 11(a)-11(c) depict the first test image 182, the matching second image 210, and the matching third image 212. These images can now be used to measure displacement of points in the respective first, second and third regions 184, 192 and 184 of the test wheel 164 in the z-axis 132. Displacement of the respective points in the z-axis 132 may be indicative of wheel misalignment. Each optical sensor 174, 176 and 178 in each camera 110, 112, 114 is offset from the z-axis 132. The orientation of the optical sensors 174, 176, 178 with respect to the z-axis 132 allows for known trigonometric equations to be used to measure the displacement of the points in the respective regions. With reference back to FIG. 5, each camera 110, 112, 114 is mounted to the frame 120. The location of each camera 110, 112, 114 is fixed with respect to the z-axis 132 at a known location for a wheel having a known size.

FIG. 7 shows a top view of the test wheel 164. The test wheel 164 is offset from the x-y plane 220, which is normal to the z-axis 132. Were the test wheel 164 as depicted in FIG. 7 to be aligned with the x-y plane, the test wheel 164 would have perfect toe. The system 108, now that it is calibrated, can measure the offset of the test wheel 164 from perfect toe.

Since the test wheel 164 is offset from the x-y plane 220 and oriented as shown in FIG. 7, the first region 184 the test wheel 164 is closer in the z-direction to the first optical sensor 174 as compared to the first region 140 of the zero-offset wheel 124 depicted in FIG. 5. Also, the second region 192 the test wheel 164 is farther in the z-direction to the second optical sensor 176 as compared to the second region 144 of the zero-offset wheel 124 depicted in FIG. 5.

FIG. 11(a) depicts the first test image 182 having a first measurement point 230. The first measurement point 230, similar to the first calibration point 150 (see FIG. 6(a)), can be a point of intersection for a vertical tangent 232 to a curve defined by the wheel rim 166. The vertical tangent 232 is a line perpendicular to the z-axis. Since the first region 184 of the test wheel 164 is offset from the x-y plane 220, the first measurement point will be offset from the calibration point 150 in an x-direction in the first test image 182. The program running on the processor 116 can superimpose the first calibration point 150 on the first test image 182 and also superimpose the vertical tangent 152 for the calibration point 150 on the first test image 182. The first calibration point 150 and the vertical tangent 152 can each be referred to as a datum, which is based on a known wheel diameter of the test wheel 164. The offset from the first measurement point 230 to the first calibration point 150 in the x-direction can be referred to as $\Delta x_1$.

FIG. 11(b) depicts the matching second image 210 having a second measurement point 234. The second measurement point 234, similar to the second calibration point 154 (see FIG. 6(b)), is a point of intersection for the vertical tangent 232 to the curve defined by the wheel rim 166. Since the second region 192 of the test wheel 164 is offset from the x-y plane 220, the second measurement point 234 will be offset from the second calibration point 154 in an x-direction in the matching second image 210. The program running on the processor 116 can superimpose the second calibration point 154 on the matching second image 210 and also superimpose the vertical tangent 152 for the second calibration point 154 on the matching second image 210. The second calibration point 154 and the vertical tangent 152 can each be referred to as a datum, which is based on a known wheel diameter of the test wheel 164. The offset from the second measurement point 234 to the second calibration point 154 in the x-direction can be referred to as $\Delta x_1$.

The misalignment, for example as measured by an angle α1 in FIG. 7, of the test wheel 164 from perfect toe is a function of $\Delta x_1$ and $\Delta x_2$. The angle from the z-axis 132 to a line of reflection perpendicular to first optical sensor 174 and emanating from the first calibration point 150 is known from the calibration of the system 108. Also, the angle between the x-y plane 220 and the line of reflection perpendicular to first optical sensor 174 and emanating from the first calibration point 150 is also known from the calibration of the system 108. Pixel size in each image, the array size of each sensor 174, 176 and 178, and the focal length of the lens for each camera 110, 112 and 114 are known. As such, known trigonometric equations can be used to determine the misalignment of the test wheel 164 based on these known angles and $\Delta x_1$ and $\Delta x_2$.

The direction of displacement for $\Delta x_1$ and $\Delta x_2$ is also used to determine misalignment of the test wheel 164. As seen when comparing FIG. 11(a) to FIG. 11(b), the first measurement point 230 is positioned to the left of (or in a negative x-direction from) the first calibration point 150 and the second measurement point 234 is positioned to the right of (or in a positive x-direction from) the second calibration point 154. Since the direction of the $\Delta x_1$ displacement is opposite the direction of the $\Delta x_2$ and the second region 192 is on an opposite side of the y-z plane as the first region 184, this is indicative of the test wheel 164 being out of alignment. As such, the processor 116 can output to a display 240 (FIG. 5) that the test wheel 164 is out of alignment. The processor 116 can determine the magnitude of the misalignment, e.g., as measured by the angle $\alpha_1$ in FIG. 7, and present this data on the display 240.

It may be the case that the direction of displacement for $\Delta x_1$ and $\Delta x_2$ are alike, e.g., the direction of displacement can be both in the positive x-direction or the negative x-direction. If this is the case, since the first region 184 is on an opposite side of the y-z plane as the second region 192, the test wheel 164 is likely offset from the frame 120 (FIG. 5) in the x-direction. As such, the processor 116 can output to the display 240 (FIG. 5) that the test wheel 164 needs adjustment with respect to at least one of the cameras 110, 112, 114 or that the system 108 needs re-calibration.

As mentioned above, the test wheel 164 rotates about the z-axis 132. The first camera 110 can obtain a plurality of first test images, similar to the first test image 182 depicted in FIG. 9(a), as the test wheel 164 is rotating. Since a plurality of first test images can be obtained, locating the first measurement point 230 can further include locating each first measurement point for each obtained first test image. Measuring the $\Delta x_1$ displacement, i.e., the distance between the first measurement point 230 and the first calibration point 150, can further include averaging the $\Delta x_1$ displacement of the each first measurement point from the first datum (i.e., the first calibration point 150 of the vertical tangent 152). By averaging these values, a more accurate reading of wheel misalignment can be measured since wheels are typically not perfectly manufactured. The same averaging of the $\Delta x_2$ displacement can be performed for the matching second image 232.

FIG. 8 shows another view of the test wheel 164 as the test wheel 164 would be viewed from a front or a rear of the vehicle. The test wheel 164 is again offset from the x-y plane 220. The location of the x-y plane 220 can be in a different location along the z-axis 132 than the x-y plane 220 shown in FIG. 7. Were the test wheel 164 as depicted in FIG. 8 to be aligned with the x-y plane, the test wheel 164 would have perfect camber. The system 108, now that it is calibrated, can measure the offset of the test wheel 164 from perfect camber. As depicted in FIG. 8, the third region 194 of the test wheel 164 is farther in the z-direction from the third optical sensor 178 as compared to the third region 148 of the zero-offset wheel 124 depicted in FIG. 5.

Referring to FIG. 11(a) the program running on the processor 116 can superimpose a horizontal (x-direction) line 252 that intersects the calibration point 150. The first calibration point 150 and the horizontal line 252 can each be referred to as a datum, which is based on a known wheel diameter of the test wheel 164. Any offset from the first measurement point 230 to the first calibration point 150 in the y-direction, which in this case there is none, can be referred to as $\Delta y_1$.

FIG. 11(c) depicts the matching third image 212 having a third measurement point 256. The third measurement point 256, similar to the third calibration point 156 (see FIG. 6(c)), is a point of intersection for a horizontal (x-direction) tangent 258 to the curve defined by the wheel rim 166. Since the third region 194 of the test wheel 164 is offset from the x-y plane 220, the third measurement point 256 will be offset from the third calibration point 156 in a y-direction in the matching third image 212. The program running on the processor 116 can superimpose the third calibration point 156 on the matching third image 212 and also superimpose the horizontal tangent 158 for the third calibration point 156 on the matching third image 212. The third calibration point 156 and the horizontal tangent 158 can each be referred to as a datum, which is based on a known wheel diameter of the test wheel 164. The offset from the third measurement point to the third calibration point in the y-direction can be referred to as $\Delta y_2$.

The misalignment, for example as measured by an angle $\alpha_2$ in FIG. 8, of the test wheel 164 from perfect camber is a function of $\Delta y_1$ and $\Delta y_2$ and the known angle of the third optical sensor 178 with respect to the x-y plane 220, which is known from the calibration of the system 108. Similar known trigonometric equations used to determine the angular offset from perfect toe can be used to determine the misalignment of the test wheel 164 from perfect camber.

Similar to that which is described above, the direction of displacement for $\Delta y_1$ and $\Delta y_2$ is also used to determine misalignment of the test wheel 164. The processor 116 can determine the magnitude of the misalignment, e.g., as measured by the angle $\alpha_1$ in FIG. 7, and present this data on the display 240. Also, multiple images can be obtained and the $\Delta y_1$ and $\Delta y_2$ values can be averaged to account for manufacturing imperfections of the test wheel 164.

The offsets $\Delta x_1$, $\Delta x_2$ $\Delta_1$, and $\Delta y_2$ can also be determined by measuring the distance between multiple calibration points (e.g., multiple calibration points are located within a pattern, or along a line or a curve in each respective image 138, 142 and 146) and multiple measurement points located within the first test image 182 or the matching images 210 and 212.

In addition to rotating images to recognize locations on a test wheel and to take wheel alignment measurements, edge points that are located within images can also be used to take wheel alignment measurements. For example, the first measurement point 230 in FIG. 11(a) can be located based on a change in reflectivity between other points in the first test image 182 adjacent the first measurement point. This first measurement point 230 can be compared to a calibration point, e.g., the first calibration point 150, having characteristics similar to the first measurement point, but with reference to the zero-offset wheel 124. For example, the first measurement point 230 is located in the first region 184 of the test wheel 164 and the first calibration point 150 is located in the first region 140 of the zero-offset wheel 124. Also, the first measurement point 230 and the first calibration point are each offset from the z-axis the same radius r, assuming that the test wheel 164 is the same size as the zero-offset wheel 124.

Since the first camera 110 is located in the same position with respect to the test wheel 164 as it was with respect to the zero-offset wheel 124, the first calibration point 150 can be located on the first test image 182. A line parallel to the x-axis can extend through the first calibration point 150, and the first measurement point 230 can be located along this line to locate a change in reflectivity that indicates the intersection of the rim 166 and the tire 168. The distance between the first measurement point 230 and the first calibration point 150 can then be measured.

Instead of rotating the first test image, the second measurement point 234 and the third measurement point 256 can be located in the respective images using the technique described in the previous paragraph. Since the location of the second and third cameras 112 and 114 with respect to the first camera 110 is known, the edge point finding technique can also be used to measure wheel alignment.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for measuring wheel alignment of a test wheel that is rotating about a z-axis using at least one camera in communication with a processor, the method comprising:
   (a) obtaining a calibration point from a calibration image of a zero-offset wheel that is the same size as the test wheel and that rotates about the z-axis;
   (b) obtaining at least one test image of the test wheel with the at least one camera and a non-structured light source;
   (c) locating a measurement point in the at least one test image, wherein the measurement point coincides with a radius that the calibration point is offset from the z-axis and the angular displacement of the calibration point from the vertical diameter of the zero-offset wheel, wherein the measurement point is further located using the processor based on a change of reflectivity between other points in the at least one test image adjacent the measurement point, and the change in reflectivity is based on a dissimilarity of reflectivity between components that make up the test wheel;
   repeating (a) and (c) to provide a plurality of calibration points and a plurality of measurement points; and
   comparing each calibration point to a respective measurement point to measure the wheel alignment.

2. The method of claim 1, further comprising:
   wherein obtaining at least one test image of the test wheel further includes
      obtaining a first test image with the at least one camera of a first region of the test wheel;
      rotating the first test image an angle $\theta_1$ about an axis parallel to the z-axis to generate a first rotated image, which is stored in a memory associated with the processor;
      obtaining a first target image with the at least one camera of a second region of the test wheel, wherein the second region is angularly offset from the first region about the z-axis the angle $\theta_1$;
      recognizing the second region of the wheel by matching the first target image to the first rotated image using a program running on the processor; and
      assigning a matching second image based on matching the first target image to the first rotated image,
   wherein locating a measurement point in the at least one test image further includes
      locating a first measurement point in the first test image; and
      locating a second measurement point in the matching second image, and
   wherein comparing each calibration point to a respective measurement point further includes
      measuring a first displacement in an axis transverse to the z-axis of the first measurement point in the first test image from a first calibration point; and
      measuring a second displacement in the axis transverse to the z-axis of the second measurement point in the matching second image from a second calibration point.

3. The method of claim 2, further comprising:
   determining a direction of the first displacement with respect to the first calibration point;
   determining a direction of the second displacement with respect to the second calibration point,
   wherein upon determining that the direction of the first displacement is opposite the direction of the second displacement and that the first region is on an opposite side of the reference plane as the second region, determining that the test wheel is out of alignment, wherein the reference plane is perpendicular to a plane defined by the z-axis and the axis transverse to the z-axis and the z-axis resides in the reference plane.

4. The method of claim 2, further comprising:
   determining a direction of the first displacement with respect to the first calibration point;
   determining a direction of the second displacement with respect to the second calibration point,
   wherein upon determining that the direction of the first displacement and the direction of the second displacement are alike, determining that the test wheel needs adjustment with respect to the at least one camera or that the at least one camera needs re-calibration.

5. The method of claim 2, wherein recognizing the second region further includes using an image matching algorithm running on the processor to recognize the second region of the test wheel.

6. The method of claim 2, wherein:
   obtaining the first test image further includes obtaining a plurality of first test images of the first region of the test wheel as the test wheel is rotating;
   locating the first measurement point further includes locating each first measurement point for each obtained first test image;
   measuring the first displacement further includes averaging the first displacement of the each first measurement point from the first calibration point;
   obtaining the first target image further includes obtaining a plurality of first target images of the second region of the test wheel as the test wheel is rotating,
   locating the second measurement point further includes locating each second measurement point for each obtained first target image; and
   measuring the second displacement further includes averaging the second displacement of each second measurement point from the second calibration point.

7. The method of claim 2, wherein obtaining the first test image further includes obtaining the first test image using a first camera of the at least one camera; and
   wherein obtaining the first target image further includes obtaining the first target image using a second camera of the at least one camera.

8. The method of claim 2 further comprising:
   rotating the first test image an angle $\theta_2$ about an axis parallel to the z-axis to generate a second rotated image;
   obtaining a second target image of a third region of the test wheel, wherein the third region is angulary offset from the first region about the z-axis the angle $\theta_2$;
   recognizing the third region of the test wheel by matching the second target image to the second rotated image
   assigning a matching third image based on matching the second target image to the second rotated image; and
   locating a third measurement point in the matching third image.

9. The method of claim 8, wherein measuring the first displacement further includes measuring a $\Delta x_1$ displacement in an x-axis, which is perpendicular to the z-axis;
   wherein measuring the second displacement further includes measuring a $\Delta x_2$ displacement in the x-axis.

10. The method of claim 9, further comprising:
    measuring a $\Delta y_1$ displacement in a y-axis, which is perpendicular to the x-axis and the z-axis, of the first measurement point in the first test image from a third calibration point;
    measuring a $\Delta y_2$ displacement in the y-axis of the third measurement point in the matching third image from a fourth calibration point.

11. The method of claim 10, further comprising:
determining a direction of the $\Delta y_1$ displacement with respect to the third calibration point;
determining a direction of the $\Delta y_2$ displacement with respect to the fourth calibration point,
wherein upon determining that the direction of the $\Delta y_1$ displacement is opposite the direction of the $\Delta y_2$ displacement, determining that the test wheel is out of alignment.

12. The method of claim 10, further comprising:
determining a direction of the $\Delta y_1$ displacement with respect to the third calibration point;
determining a direction of the $\Delta y_2$ displacement with respect to the fourth calibration point,
wherein upon determining that the direction of the $\Delta y_1$ displacement and the direction of the $\Delta y_2$ displacement are alike, determining that the test wheel needs adjustment with respect to the at least one camera or that the at least one camera needs re-calibration.

13. A system for measuring wheel alignment comprising:
at least one camera offset from a wheel that rotates about a z-axis, wherein the at least one camera is configured to obtain a calibration image of a zero-offset wheel that is the same size as the test wheel and that rotates about the z-axis, and the at least one camera is further configured to obtain at least one test image of a test wheel using a non-structured light source;
a processor in communication with at least one camera, the processor being configured
   to locate a calibration point from the calibration image based on a change in reflectivity between other points in the calibration image adjacent the calibration point;
   to locate a measurement point in the at least one test image, wherein the measurement point coincides with a radius that the calibration point is offset from the z-axis and the angular displacement of the calibration point from the vertical diameter of the zero-offset wheel, and
   to further locate the measurement point based on a change of reflectivity between other points in the at least one test image adjacent the measurement point, and
   to compare the calibration point to the measurement point.

14. The system according to claim 13, wherein the at least one camera is positioned with respect to the test wheel to obtain a first test image of a first region of the test wheel and a first target image of a second region of the test wheel, wherein the second region is angularly offset an angle $\theta_1$ from the first region about the z-axis;
wherein the processor is further configured
   to rotate the first test image the angle $\theta_1$ about an axis parallel to the z-axis to generate a first rotated image, which is stored in a memory associated with the processor;
   to recognize the second region of the wheel by matching the first target image to the first rotated image using a program running on the processor;
   to assign a matching second image based on matching the first target image to the first rotated image;
   to locate a first measurement point in the first test image;
   to locate a second measurement point in the matching second image;
   to measure a first displacement in an axis transverse to the z-axis of the first measurement point from a first calibration point in the first test image;
   to measure a second displacement in the axis transverse to the z-axis of the second measurement point from a second calibration point in the matching second image.

15. A method for measuring wheel alignment using at least one camera in communication with a processor comprising:
obtaining a first test image of a first region of a test wheel with the at least one camera and a non-structured light source, wherein the test wheel rotates about a z-axis;
locating a first measurement point in the first test image, wherein the first measurement point is offset a radius r from the z-axis and is located based on a change in reflectivity between other points in the first test image adjacent the first measurement point;
measuring a first displacement in an axis transverse to the z-axis of the first measurement point from a first calibration point in the first test image, wherein the first calibration point is offset from a rotational axis of a zero-offset wheel, which is similar in size to the test wheel, the radius r and the first calibration point is located in a first region of the zero-offset wheel, which is in a similar location on the zero-offset wheel as the first region of the test wheel;
obtaining a second test image of a second region of the test wheel with the at least one camera and the non-structured light source;
locating a second measurement point in the second test image, wherein the second measurement point is offset the radius r from the z-axis and is located based on a change in reflectivity between other points in the second test image adjacent the second measurement point;
measuring a second displacement in the axis transverse to the z-axis of the second measurement point from a second calibration point in the second test image, wherein the second calibration point is offset from the rotational axis of the zero-offset wheel the radius r and the second calibration point is located in a second region of the zero-offset wheel, which is in a similar location on the zero-offset wheel as the second region of the test wheel.

* * * * *